United States Patent [19]

Shen et al.

[11] Patent Number: 4,634,274
[45] Date of Patent: Jan. 6, 1987

[54] METHOD AND APPARATUS FOR DETERMINING ATTENUATION ACROSS OPTICAL FIBER SPLICE

[75] Inventors: Nelson M. Shen, San Jose; Robert Zimmerman, Cupertino, both of Calif.

[73] Assignee: Raychem Corporation, Menlo Park, Calif.

[21] Appl. No.: 630,921

[22] Filed: Jul. 16, 1984

Related U.S. Application Data

[63] Continuation-in-part of Ser. No. 545,413, Oct. 25, 1983.

[51] Int. Cl.$^4$ .................... G01N 21/59; G01N 21/84
[52] U.S. Cl. ................................................ 356/73.1
[58] Field of Search ............................ 356/73.1, 434; 350/96.15, 96.21

[56] References Cited

U.S. PATENT DOCUMENTS 4,309,105  1/1982  Lebduska ........................... 356/434

OTHER PUBLICATIONS

Gloge, "Offset & Tilt Loss in Optical Fiber Splices", Bell System Tech. Journal, vol. 55, No. 7, Sep. 1976.
Usui et al. "Exact Splice Loss Prediction for Single-Mode Fiber" IEEE Jour of Qunntem Electronics, vol. QE18, No. 4, Apr. 1982, pp. 755-758.
Cocito et al., Fibre to Fibre Coupling with Three Different Fibre Core Diameters & Selt Rapporti Technici, vol. VI, No. 1 (1978) pp. 113-119.
Kato et al., "New Optical Monitoring Method for Arc-Fusion Splices of Single Mode Fibres & High-Precision Estimation of Splice Loss" Electronics Letters Oct. 28, 1982, vol. 18, No. 22, pp. 972-973.

Primary Examiner—Vincent P. McGraw
Attorney, Agent, or Firm—Dennis E. Kovach; Herbert G. Burkard

[57] ABSTRACT

A method and apparatus for determining optical power attenuation across a splice between first and second optical fibers utilizes the algorithm:

$$dB = 10 \log (1 - L_{tel}) \tag{2}$$

where $L_{tel}$ is determined by compensating for differences in intensity profiles existant in the first optical fiber when injecting light therein for purposes of measuring attenuation versus the intensity profile created when injecting light into the first fiber for transmitting telecommunications data and the light has been propagating in the fiber for a distance and steady state intensity distribution is achieved. Preferably, a numerical aperture of the first optical fiber and a sample optical fiber are empirically determined, and $L_{tel}$ is calculated by compensating for differences between these numerical apertures.

18 Claims, 3 Drawing Figures

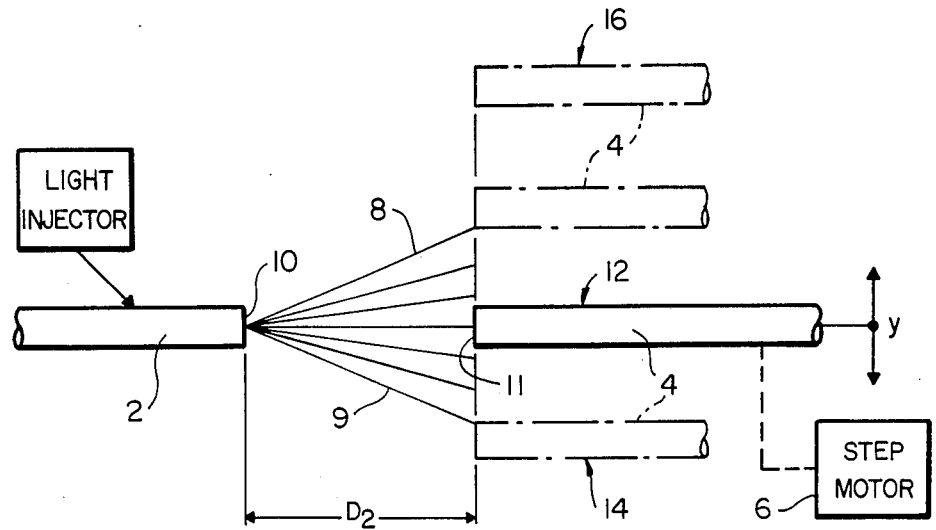
FIG__1
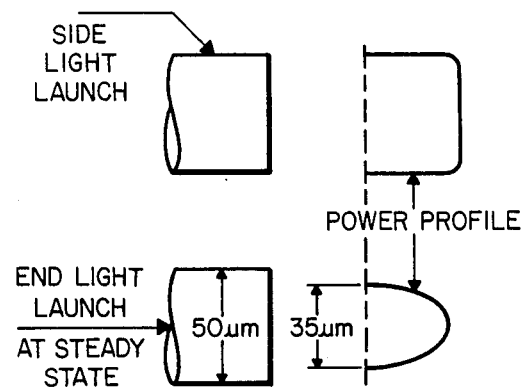
FIG__2
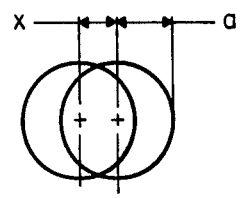
FIG__3

METHOD AND APPARATUS FOR DETERMINING ATTENUATION ACROSS OPTICAL FIBER SPLICE

CROSS-REFERENCE TO RELATED APPLICATION

The present application is a continuation-in-part of U.S. application Ser. No. 545,413, the disclosure of which is incorporated herein by reference.

BACKGROUND OF THE INVENTION

In the U.S. Ser. No. 545,413 application, a method and apparatus are disclosed for measuring attenuation (dB) across a splice between first and second fibers having ends separated by a distance $D_1$ by (1) injecting light into the first fiber and measuring the power $P_2$ in the second fiber when ends of the fibers are separated a distance $D_2$ and are in substantial axial alignment; (2) again injecting light into the first fiber and measuring the power $P_1$ in the second fiber when the ends of the fibers are separated by the distance $D_1$ and in substantial axial alignment, the distance $D_2$ being much larger than the distance $D_1$; and (3) using the algorithm $$dB = 10 \log \frac{P_1}{RP_2} \quad (1)$$

where R is a predetermined constant determined under zero attenuation loss conditions. Specifically, R equals $P_1'/P_2'$ where $P_1'$ is the power in the light-receiving second fiber when no attenuation loss occurs between the ends of the first and second fibers, and $P_2'$ is the power in the same second fiber when the ends of the first and second sample fibers are separated by a distance $D_2'$. Preferably, R is determined in the laboratory, with $P_1'$ preferably being obtained by simply measuring the power in a sample piece of unbroken fiber (since the fiber is not broken, zero attenuation loss occurs across an "imaginary splice"), with $P_2'$ being obtained by subsequently breaking the sample piece of fiber and separating ends thereof by the distance $D_2'$. As explained in the U.S. Ser. No. 545,413 application, $D_2$ should be substantially equal to $D_2'$ for equation 1 to directly apply. However, if $D_2$ is not set equal to $D_2'$, appropriate empirical corrections can be made by referring to a chart at page 310 of *Optical Fibers for Transmission*, John E. Midwinter, John Wiley & Sons Inc., 1979, for single-mode fibers and the chart at page 175 of *Fundamentals of Optical Fiber Communications*, 2nd ed., Michael Barnoski, Academic Press, 1981, for multimode fibers, the disclosures of these articles being incorporated herein by reference.

In addition, it is preferable to calculate all optical powers $P_1$, $P_2$, $P_1'$, $P_2'$ using the same type of light launch and light withdrawal means. If different means are utilized further empirical correction factors are required. According to a preferred embodiment of the U.S. Ser. No. 545,413 application, light launch and light withdrawal is accomplished directly through a side of the fibers through their buffers in a manner similar to that disclosed in copending U.S. application Ser. Nos. 437,053 and 614,884, the disclosures of which are incorporated herein by reference.

SUMMARY OF THE INVENTION

It is an object of the present invention to provide a method and apparatus for calculating attenuation across a splice, which method and apparatus compensates for differences between fibers used in the lab for calculating predetermined constants and the fibers being spliced in the field. It is a further object of the invention to further compensate for differences in intensity profiles which may exist due to a difference between the intensity profile in the fibers being spliced at the time of splicing and the actual intensity profile which exists in the fibers in use.

These and other objects are achieved by a method and apparatus for measuring attenuation across a splice wherein an alogithm utilized for the calculation contains a correction factor which compensates for differences between fibers utilized in the laboratory for calculating a predetermined constant and the fibers in the field for which the splice is to be made. The algorithm further contains a correction factor which compensates for differences in the intensity profile which exists in the fibers being spliced in the field when the calculation is being made and the intensity profile which will exist in these fibers when they are used for transmitting actual optical signals for data communication.

BRIEF DESCRIPTION OF THE DRAWINGS

FIG. 1 illustrates an arrangement for obtaining information which enables an attenuation calculation to compensate for differences between a sample optical fiber used for calculating a predetermined constant for the attenuation calculation and the fibers actually being used for the splice;

FIG. 2 illustrates a difference in intensity profiles in the fibers when light is injected therein from a side of the fiber and from an end of the fiber;

FIG. 3 illustrates an approximate offset area which results when ends of first and second fibers are not exactly aligned.

DESCRIPTION OF THE PREFERRED EMBODIMENTS

According to a preferred embodiment of the invention, a method and apparatus are disclosed for calculating attenuation loss across a splice between first and second fibers having ends separated by a distance $D_1$, wherein a correction is made for differences between optical properties of a sample optical fiber used in the laboratory to determine a predetermined constant necessary for the attenuation calculation and the optical properties of the first and second fibers being spliced.

To calculate attenuation in dB for the splice to be made, preferably the first and second fiber ends are substantially aligned and spaced apart by a distance $D_1$ suitable for splicing. Substantial axial alignment can be confirmed by injecting light into the first fiber and monitoring light in the second fiber while moving the second fiber relative to the first fiber. The distance $D_1$ can range from zero to about 50 microns. While it is possible to have the fiber ends touching for completion of the splice, thus having $D_1$ equal to zero, it is generally not desirable because it is difficult to accurately position the fiber ends if they are touching. The distance $D_1$ is usually determined by finding the distance between the fiber ends which gives the optimum splice performance. In general, it is preferred that $D_1$ be less than 20 microns and it is most preferred that $D_1$ be about 10 microns or less.

Subsequent to substantially aligning the first and second fibers at the distance $D_1$, the fiber ends are separated axially to a distance $D_2$ which can range from 50 to 500 microns. It has been found that $D_2$ generally is preferred to be about 150 to 400 microns, most preferably 350 microns. Slight axial misalignment of the first and second fibers will not significantly affect the power $P_2$ measured in the second optical fiber since it is relatively constant at the relatively large distance $D_2$ so long as the lateral misalignment is less than about ±20 microns. With the fibers so separated a distance $D_2$, the power $P_2$ is measured.

Next, the fiber ends are substantially axially aligned at the distance $D_1$, and without disturbing the power injected into the first fiber and withdrawn from the second fiber so that the power $P_1$ in the second fiber can be measured. Subsequently, the attenuation dB in decibels is calculated from the formula $$dB = 10 \log \frac{P_1}{RP_2} \quad (1)$$

In this equation R is a predetermined constant determined in the laboratory under zero attenuation loss conditions. More specifically, in the laboratory, an optical fiber substantially identical to that being spliced has light injected therein and withdrawn therefrom, the withdrawn power corresponding to $P_1'$. Since the sample fiber in the laboratory does not contain a splice, the power $P_1'$ represents a zero attenuation power loss which would occur across an ideal splice. Subsequent to determining $P_1'$, the fiber is broken and separated a distance $D_2'$, with power being injected into the first fiber and withdrawn from the second fiber, the withdrawn power being $P_2'$. If $D_2'$ equals $D_2$, then R equals $P_1'/P_2'$. On the other hand, if $D_2'$ does not equal $D_2$, an empirical correction factor must be utilized to obtain the appropriate value for R. Furthermore, the means and method for injecting light into the sample fiber and withdrawing the light therefrom in the laboratory should be the same as the means and method for injecting the light into the first fiber and withdrawing the light from the second fiber prior to forming the splice; otherwise, further empirical correction factors are required to account for differences in the amount of light injected and withdrawn by any different methods utilized.

To obtain further accuracy in calculating the attenuation, it has been found it is desirable to utilize the more generalized equation as follows:

$$dB = 10 \log (1 - L_{tel}) \quad (2)$$

where $L_{tel}$ is the actual light insertion loss from the first fiber to the second fiber across the splice when the first and second fibers are used to transmit light and when the intensity profile is at steady state condition.

It has been found that enhanced accuracy is obtained if a numerical aperture of the sample fiber in the laboratory is determined at the distance $D_2$ or the distance $D_2'$ and if the numerical aperture of the first and second fibers being spliced is likewise determined. One method for determining these numerical apertures is illustrated in FIG. 1. This method comprises:

(1) positioning the ends 10, 11 of the broken sample fiber pieces 2, 4 a distance $D_2$ apart;
(2) injecting continuously an optical signal into the first sample fiber piece 2;
(3) withdrawing continuously an optical signal from the second sample fiber piece 4;
(4) moving the second sample fiber piece 4 along the y direction by utilizing any appropriate means, such as a step motor driven translation stage 6.

By so monitoring the light signal withdrawn from the second sample fiber piece 4, one can determine the location of upper-most and lower-most light rays 8, 9, as well as the distance therebetween. If a step motor 6 is utilized, the numerical aperture of the first sample fiber piece 2 can be empirically determined by the amount of steps required to move the second optical fiber piece 4 between positions 12 and 14.

In practice, to minimize backlash error, preferably the second sample optical fiber piece is moved upwards well beyond location 12 by, say, 50 steps, and then moved downwards to determine the exact position of the light ray 8. The second fiber piece is then moved further downwards to determine the location of the lower-most light ray 9. Furthermore, to increase accuracy and sensitivity, rather than trying to determine the exact locations 12, 14 where the optical power withdrawn from the second sample optical fiber piece 4 is exactly equal to zero where instrument sensitivity could present problems, it is preferable to determine the locations 12, 14 where the withdrawn optical power equals some small predetermined fraction of a maximum power monitored in the second sample optical fiber piece 4, say, 2%. In other words, as the fiber piece 4 is moved downwards along the y direction from an extreme top position 16 subsequent to noting a maximum withdrawn power in the fiber piece 4, the positions 12, 14 can be noted as well as the steps required by the motor 6 to move the fiber 4 between the positions 12, 14. This number of steps is then stored in a microprocessor.

Similarly, when measuring attenuation loss across a splice between first and second fibers, either before or after determining $P_2$, the second fiber can likewise be moved in the y direction in the same manner as described for the fiber piece 4 to determine empirically the numerical aperture of the first fiber.

Preferably, when determining these numerical apertures, identical distances $D_2$ should be used in both the laboratory and when performing the splice; otherwise further empirical corrections are required to be made to compensate for any differences. Preferably, a microprocessor is used to store equation 2 as well as further equations for calculating $L_{tel}$, and a plurality of different types of sample fibers are measured in a laboratory so that attenuation losses for a wide variety of optical fibers to be spliced can be readily calculated in the field. Specifically, a plurality of graded index fibers having different-size cores can be tested in the laboratory as well as a plurality of step-index-type fibers having a plurality of different-size cores.

Further accuracy is obtainable in the attenuation calculation if a correction factor is incorporated into equation 2 which compensates for a difference in a power profile in the first and second optical fibers when light is being launched therein for attenuation calculation purposes, and the intensity profile in the first and second optical fibers when light is being launched therein for data communication. In particular, it is preferable to launch light into a side of the fiber as a matter of convenience for purposes of aligning the fibers and for performing the attenuation calculation which results in a substantially square power profile, as illustrated in FIG. 2, whereas when utilizing the fibers 2, 4 for data communication subsequent to the splice, light is generally launched from an end of the fiber resulting in a somewhat sinusoidal-like energy or intensity profile as also illustrated in FIG. 2.

EXAMPLE

The following example illustrates a practical embodiment of the principles of the present invention for the case of a graded-index fiber comprising a glass core and a glass cladding, with the core being 50 microns in diameter, and with $D_2 = D_2' = 350$ microns.

A first empirical correction is made to compensate for the difference in the intensity profiles resulting when the attenuation loss measurements are calculated using a different light launch system than which will be used in telecommunication data transmission for the optical fibers subsequent to the splice. Assuming side light launch and light withdrawal, it can empirically be shown that a light insertion loss $L_{box}$ between first and second fibers having a diameter $2a$ whose centers are offset by a distance x (FIG. 3) can be approximated by:

$$L_{box} = 0.849 \frac{x}{a} \qquad (3)$$

If $x << a$, and assuming the local variation of the numerical aperture is ignored, the misaligned area is substantially equal to a rectangle having sides of length a and x. Since $a = 25$ microns, $$L_{box} = 0.034x \qquad (4)$$

with x being in microns.

From D. Gloge, *Offset and Tilt Loss in Optical Fiber Splices*, the Bell System Technical Journal, Volume 55, No. 7, September, 1976, the disclosure of which is incorporated herein by reference, it is shown that an insertion loss for a telecommunication power profile is as follows:

$$L_{tel} = 3.25 \, L_{box}^2 \qquad (5)$$

Substituting equation 5 into equation 2 results in:

$$dB = 10 \log (1 - 3.25 \, L_{box}^2) \qquad (6)$$

By power expansion and after dropping all higher-order terms, equation 6 becomes:

$$dB = -[14.13 \, L_{box}^2 + 22.96 \, L_{box}^4] \qquad (7)$$

It can easily be shown that:

$$L_{box} = 1 - \frac{P_1/P_2}{P_1'/P_2'} \qquad (8)$$

where $P_1$, $P_2$, $P_1'$, $P_2'$ are as explained above with $D_2' = D_2$. Substituting equation 8 into equation 6 or 7 gives the attenuation in dB across the splice where correction has been made for differences in power profiles between that generated for light used for transmitting telecommunication data (end launch) and that used for determining $P_1$, $P_2$, $P_1'$, and $P_2'$ (side launch).

To further increase accuracy, a correction can be made to compensate for any minute or significant difference between the numerical aperture of the fibers used in the laboratory for determining $P_1'/P_2'$, and the first and second fibers being spliced in the field. Specifically, it can be shown, with this correction, that equation 8 becomes:

$$L_{box} = 1 - \frac{P_1/P_2}{P_1'/P_2'} \left(\frac{S'}{S}\right)^4 \qquad (9)$$

where S' and S are the number of motor steps between positions 12, 14 indicative of the numerical aperture of the sample fiber used in the laboratory for generating $P_1'$, $P_2'$, and the first and second fibers being spliced in the field, respectively. The factor $(S'/S)^4$ is experimentally and empirically determined, it being dependent on the type of fiber being spliced, the value of $D_2$ which equals $D_2' = 350$ microns, and the type of light launch used.

Accordingly, substitution of equation 9 into equation 6 or 7 yields an accurate attenuation value for the graded index 50 micron diameter fiber.

It should readily be understood that other equations similar to equations 4, 5, and 9 can be formulated for other types of fibers, for the values of $D_2 = D_2'$ other than 350 microns, and for other intensity profile differences existent in the fibers when (1) the attenuation factors $P_1$, $P_2$, $P_1'$, $P_2'$ are being determined and (2) the first and second fibers are being used to transmit telecommunication data subsequent to the splice. Accordingly, the invention should not be construed to be limited to only attenuation calculations utilizing equations 6 and 9.

We claim:

1. An apparatus for determining attenuation across an optical fiber splice between a first fiber and a second fiber, comprising:

means for launching optical signals into the first fiber;
   means for positioning ends of the fibers at a distance $D_2$ and measuring a second optical signal $P_2$ in the second fiber generated by a second optical signal launched into the first fiber;
   means for positioning the fiber ends at a distance $D_1$ and measuring a first optical signal $P_1$ in the second fiber generated by a first optical signal launched into the first fiber, $D_2$ being greater than $D_1$;
   means for calculating the attenuation dB across the optical fiber splice using the algorithm;

$$dB = 10 \log (1 - L_{tel}) \qquad (2)$$

where $L_{tel}$ is empirically determined from $P_1$, $P_2$, $P_1'$ and $P_2'$, $P_1'$ being a third optical signal measured in a sample optical fiber created by launching the third optical signal into the sample optical fiber, $P_2'$ being a fourth optical signal measured in the sample optical fiber created by launching a fourth optical signal into the sample optical fiber, the launched fourth optical signal passing between confronting ends of the sample optical fiber.

2. The apparatus as claimed in claim 1, further comprising means for moving the second optical fiber along a direction substantially perpendicular to an axis of the first and second fibers to empirically determine a numerical aperture of the first optical fiber, the calculating means empirically determining $L_{tel}$ from the numerical aperture of the first optical fiber and a numerical aperture of the sample optical fiber.

3. The apparatus as claimed in claim 2, the calculating means further utilizing the algorithms $$L_{tel} = 3.25 \, L_{box}^2 \quad (4)$$

$$L_{box} = 1 - \frac{P_1/P_2}{P_1'/P_2'} \left(\frac{S'}{S}\right)^4 \quad (9)$$

where S is indicative of the numerical aperture of the first optical fiber, S' is indicative of the numerical aperture of the sample optical fiber, $P_1'$ is a measured optical signal in the sample optical fiber across a substantially zero attenuation loss section, and $P_2'$ is an optical power in the sample optical fiber when the confronting ends thereof are separated by the distance $D_2$.

4. The apparatus as claimed in claim 1, the optical power $P_2'$ being measured across a gap between the confronting ends of the sample optical fiber, the gap being a distance equal to $D_2'$.

5. The apparatus as claimed in claim 4, wherein $D_2'$ equals $D_2$.

6. The apparatus as claimed in claim 4, further comprising means for moving the second optical fiber along a direction substantially perpendicular to an axis of the first and second fibers to empirically determine a numerical aperture of the first optical fiber, the calculating means empirically determining $L_{tel}$ from the numerical aperture of the first optical fiber and a numerical aperture of the sample optical fiber.

7. The apparatus as claimed in claim 2, the calculating means empirically determining $L_{tel}$ by compensating for a difference between a power profile in the first and second optical fibers when light is launched into the first optical fiber for attenuation calculation purposes and a power profile expected to exist in the first and second optical fibers when transmitting telecommunication data.

8. The apparatus as claimed in claim 6, the calculating means empirically determining $L_{tel}$ by compensating for a difference between a power profile in the first and second optical fibers when light is launched into the first optical fiber for attenuation calculation purposes and a power profile expected to exist in the first and second optical fibers when transmitting telecommunication data.

9. A method of determining attenuation across an optical fiber splice between a first fiber and a second fiber, comprising the steps of:
   launching an optical signal into the first fiber;
   positioning ends of the first and second fibers in substantial axial alignment at a distance $D_2$ and measuring a second optical power $P_2$ of a second optical signal in the second fiber;
   positioning the fiber ends in substantial axial alignment at a distance $D_1$ at which the fiber ends are positioned for splicing and measuring a first optical power $P_1$ of the first optical signal in the second fiber, $D_2$ being greater than $D_1$; and
calculating the attenuation dB from the algorithm $$dB = 10 \log (1 - L_{tel}) \quad (2)$$

where $L_{tel}$ is empirically determined from $P_1$, $P_2$, $P_1'$ and $P_2'$, $P_1'$ being a measured optical power of a third optical signal launched into a sample optical fiber, $P_2'$ being another measured optical power in the sample optical fiber created by launching a fourth optical signal into the sample optical fiber, the fourth optical signal passing between confronting ends of the sample optical fiber.

10. The method as claimed in claim 9, the optical power $P_2'$ being measured across a gap between the confronting ends of the sample optical fiber, the gap being a distance equal to $D_2'$, the sample optical fiber being of a type similar to the second optical fiber.

11. The method as claimed in claim 10, wherein $D_2'$ equals $D_2$.

12. The method as claimed in claim 11, wherein the first, second, and sample optical fibers are of the same type.

13. The method as claimed in claim 9, further comprising the step of determining $L_{tel}$ by compensating for differences in power profiles in the first optical fiber created when (1) launching light into the first optical fiber by the launching step, and (2) launching light into the first optical fiber for transmitting telecommunication data.

14. The method as claimed in claim 9, further comprising the step of empirically determining a numerical aperture S, S' of the first and sample fibers, respectively, and determining $L_{tel}$ by compensating for a difference between the numerical apertures of the first and sample fibers.

15. The method as claimed in claim 13, further comprising the step of empirically determining a numerical aperture S, S' of the first and sample fibers, respectively, and determining $L_{tel}$ by compensating for a difference between the numerical apertures of the first and sample fibers.

16. The method as claimed in claim 15 wherein the first and sample fibers comprise graded index fibers having approximately a 50 micron diameter core.

17. The method as claimed in claim 16, further comprising the step of calculating the attenuation from the following algorithms:

$$dB = -[14.13 \, L_{box}^2 + 22.96 \, L_{box}^4] \quad (7)$$

$$L_{box} = 1 - \frac{P_1/P_2}{P_1'/P_2'} \left(\frac{S'}{S}\right)^4 \quad (9)$$

18. The method as claimed in claim 15, wherein $D_2$ is between 50 and 500 microns, and $D_1$ is between zero and 50 microns.

* * * * *